United States Patent
Story (10) Patent No.: US 9,624,968 B1
(45) Date of Patent: Apr. 18, 2017

(54) SWING ARM LATCH FOR A WHEEL SERVICING MACHINE

(71) Applicant: Hennessy Industries, Inc., LaVergne, TN (US)

(72) Inventor: John Story, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 535 days.

(21) Appl. No.: 14/068,512

(22) Filed: Oct. 31, 2013

Related U.S. Application Data (60) Provisional application No. 61/720,783, filed on Oct. 31, 2012.

(51) Int. Cl.
*F16C 11/10* (2006.01)
*B60C 25/138* (2006.01)

(52) U.S. Cl.
CPC ............ *F16C 11/10* (2013.01); *B60C 25/138* (2013.01)

(58) Field of Classification Search
CPC ............................... F16C 11/10; B60C 25/138
USPC ................................................. 157/1.24, 1.28
See application file for complete search history.

(56) References Cited

U.S. PATENT DOCUMENTS

| | | | |
|---|---|---|---|
| 2,581,569 A | 1/1952 | Zugaro et al. | |
| 3,581,796 A | 6/1971 | Alm | |
| 4,662,771 A | 5/1987 | Roe et al. | |
| 4,693,656 A | 9/1987 | Guthrie | |
| 4,787,794 A | 11/1988 | Guthrie | |
| 4,809,759 A | 3/1989 | Dale et al. | |
| 5,252,010 A | 10/1993 | Obrecht et al. | |
| 5,381,843 A | 1/1995 | Corghi | |
| 5,472,034 A * | 12/1995 | Corghi | B60C 25/132 |
| | | | 157/1.24 |
| 6,056,034 A | 5/2000 | Matnick | |
| 6,182,736 B1 * | 2/2001 | Cunningham | B60C 25/135 |
| | | | 157/1.17 |
| 6,422,285 B1 | 7/2002 | Gonzaga | |
| 6,523,799 B2 | 2/2003 | Su | |
| 9,193,227 B1 * | 11/2015 | Story | B60C 25/132 |
| 2012/0298313 A1 * | 11/2012 | Barbetti | B60C 25/132 |
| | | | 157/1.17 |

* cited by examiner

*Primary Examiner* — Joseph J Hail
*Assistant Examiner* — Marc Carlson
(74) *Attorney, Agent, or Firm* — Patterson Intellectual Property Law, P.C.; Mark J. Patterson; Garrett M. Hausman (57) ABSTRACT

A swing arm latch for a wheel servicing machine provides at least one moveable locking member associated with a support column or a swing arm. The locking member may be selectively engaged with the other one of the support column and swing arm, or may be alternatively engaged with a corresponding structure attached to or defined on the other one of the support column and swing arm. When the locking member is engaged, the swing arm is fixed at a desired angular position relative to the support column. When the locking member is disengaged, the swing arm may freely move in at least one angular direction. In some embodiments, a first locking member is attached to a support column, and a second locking member is attached to the swing arm, wherein the first and second locking members are selectively engageable to lock the swing arm at a desired angular position.

8 Claims, 6 Drawing Sheets

SWING ARM LATCH FOR A WHEEL SERVICING MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates to wheel servicing machines, and more particularly to tire changing machines with one or more angularly moveable swing arms for assisting in wheel servicing operations.

In some conventional wheel servicing tasks, an operator places a wheel rim on a rotatable wheel holder which is mounted on the base of the machine. The operator secures the rim to the wheel holder and then mounts a tire onto the wheel rim using a mount/demount head or other tool to force the bead of the tire over the wheel rim. The mount/demount head is typically attached to a swing arm that can be moved in and out of position relative to the wheel rim so that a tool on the swing arm may engage the tire to mount or demount the tire on the wheel rim.

Conventional wheels rims and tires are available in numerous sizes. This requires that a swing arm be moveable in order to accommodate different sizes of various tires and wheel rims. Additionally, an operator may choose to use a tool positioned on a swing arm for some, but not all, wheel servicing operations. Thus, the swing arm should be moveable away from the wheel rim when not being used.

In some applications, if the swing arm is not held in place, it has the potential to swing outwardly, injuring either the operator or another person nearby. For example, during some wheel servicing operations, force may be applied suddenly against the swing arm which could dislodge the swing arm or cause the swing arm to move rapidly away from a desired position.

To combat this problem operators are typically required to hold the swing arm in place manually, which limits the use of an operator's hand. Moreover, manual securement of the swing arm does not guarantee the swing arm will remain at the desired location. Others have attempted to solve this problem by providing an angular stop for the swing arm. However, conventional solutions only restrict movement of the swing arm in one angular direction, and do not prevent the swing arm from moving freely in the opposite angular direction. Thus, previous efforts are insufficient because they still allow the swing arm to rotate outwardly. The swing arm would also be able to move outwardly during the operation of the tire changing apparatus into an undesirable position unless the operator continually holds the swing arm into position manually.

What is needed then are improvements in wheel servicing machines and more particularly in latching devices and associated methods for selectively securing a swing arm at a desired angular location on a tire changing machine.

BRIEF SUMMARY OF THE INVENTION

The present invention provides a wheel servicing machine with a swing arm latch for securing the angular position of the swing arm relative to the support column in both angular directions.

In some embodiments, the tire changing apparatus includes a base, a rotatable tire holder mounted on the base, a support column extending from the base, a swing arm pivotally attached to the support column, and a latch associated with both the swing arm and the support column, the latch configured to selectively lock the swing arm at a desired angular position.

A first embodiment of the latch includes a sliding member slidably attached to the swing arm and a stop shaft which is attached, either directly or indirectly, to the support column. The sliding member slides relative to the swing arm in order to engage the stop shaft, thereby locking the position of the swing arm at a desired angular location. The sliding member may include a moveable plate in some embodiments. The plate is attached to the swing arm via one or more longitudinal slots and corresponding rails protruding toward the plate. The plate may be slid toward the stop shaft to engage the stop shaft and lock the swing arm in place. The plate may also slide away from the stop shaft to release the swing arm.

A second embodiment of the latch includes a first locking member which is pivotally attached to either the support column or to the swing arm in various embodiments. The first locking member may include a first gear portion pivotally connected to the support column via a support flange extending from the support column. The first locking member can rotate to engage a second locking member including a second gear portion connected to the swing arm. When the first gear portion is engaged with the second gear portion the swing arm position is locked in place relative to the support column.

When either embodiment of the swing arm latch is disengaged, the swing arm can be moved in an outwardly direction away from the operator's workspace. When the swing arm latch is engaged, the position of the swing arm can be fixed in place and may be finely adjusted in some embodiments for optimal positioning.

Numerous other objects, advantages and features of the present invention will be readily apparent to those of skill in the art upon a review of the following drawings and description of a preferred embodiment of the invention.

DETAILED DESCRIPTION OF THE INVENTION

Figure 1:
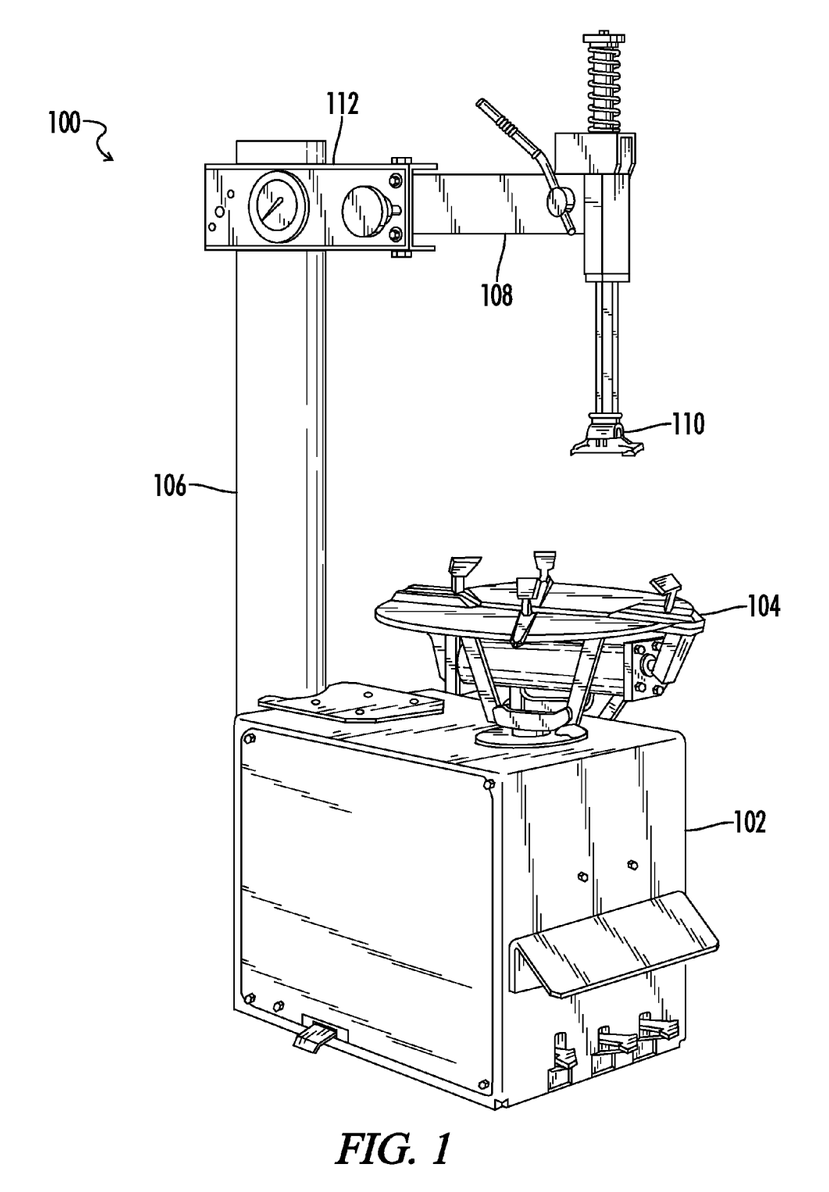
FIG. 1 is a perspective view of an embodiment of a wheel servicing machine.

As seen in FIG. 1, a wheel servicing machine 100 includes a swing arm style tire changing machine in some embodiments. In additional embodiments, the teachings of the present disclosure may be used with other types of wheel servicing machines known in the art. Wheel servicing machine 100 includes a base 102, a rotatable wheel holder 104 on the base 102, a support column 106 extending from the base 102, and a pivotable swing arm 108. In some embodiments, swing arm 108 is pivotally attached to support column 106. In various other embodiments, swing arm 108 may be attached to another structure disposed on, extending from, or located near base 102.

A tire changing tool head 110 extends toward the wheel holder 104 from swing arm 108. In some embodiments, tire changing tool head 110 is disposed on the lower end of a moveable tool head shaft. Any of the identified structural features of the wheel servicing apparatus 100 can be attached to the support column 106 either directly or indirectly through one or more intermediate structural fasteners, supports, brackets, mounts, etc. A support flange 112 rigidly extends from support column 106 in some embodiments. Swing arm 108 may be pivotally attached to support column 106 via support flange 112 in some embodiments.

Figure 2A:
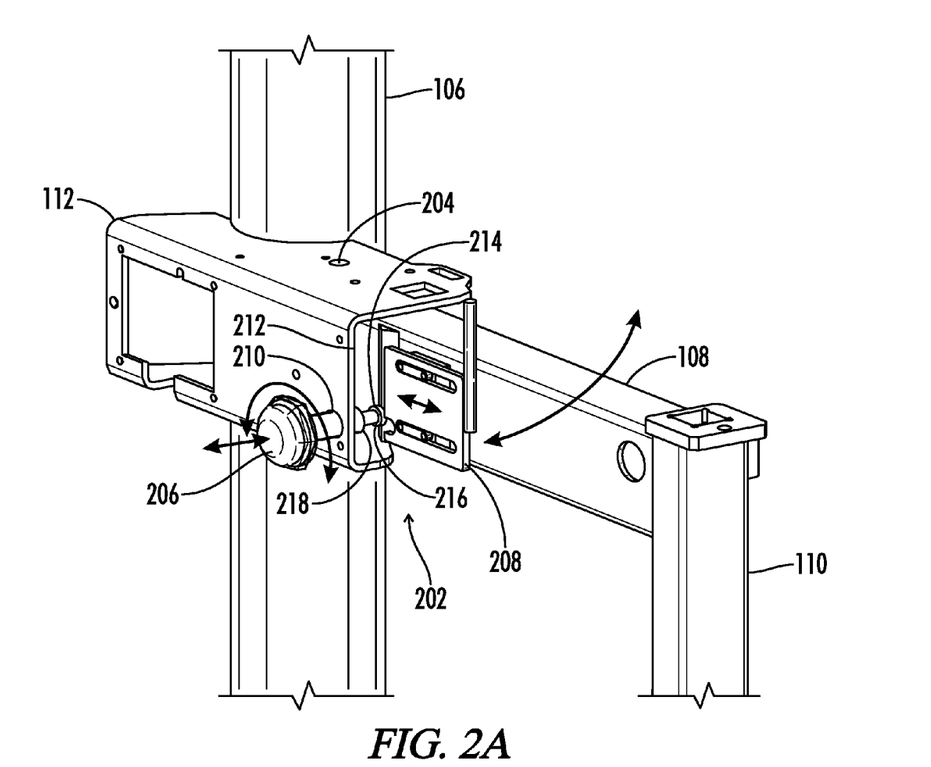
FIG. 2A is a perspective view of a first embodiment of a swing arm latch in a disengaged, or unlocked, position.
Figure 2B:
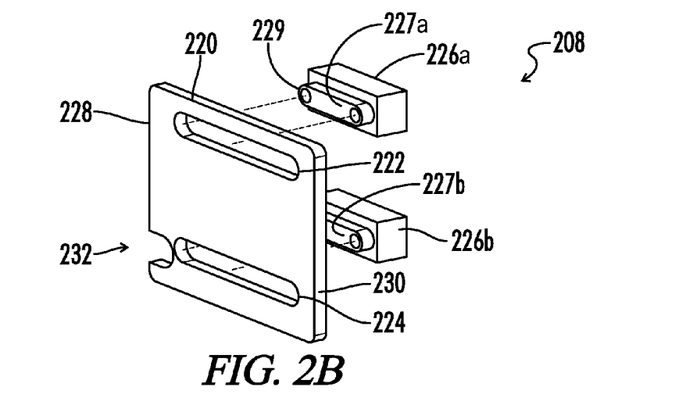
FIG. 2B is an exploded perspective view of a second locking member on the first embodiment of a swing arm latch of FIG. 2A.

Referring to FIGS. 2A and 2B, a latch 202 is associated with swing arm 112 to selectively secure swing arm 112 at a desired angular position relative to wheel holder 104. Latch 202 is also operable to selectively release or unlock swing arm 112 such that swing arm 112 may freely pivot in one or both angular directions. For example, during wheel servicing operations, swing arm 112 may be positioned at a desired angular location relative to wheel holder 104 for performing a specific task. The desired swing arm location may change between tasks, and in many applications it may be desirable to quickly and easily lock swing arm 112 at a desired position such that swing arm 112 cannot move in either angular direction. Additionally, it is desirable to be able to quickly and easily disengage, or unlock, latch 202 such that swing arm 112 may be moved away from the set angular position associated with engagement of latch 202.

A swing arm latch may be installed on wheel servicing machine 100 in a variety of embodiments. FIG. 2A shows a perspective view of a first embodiment of latch 202 installed on a wheel servicing machine. Latch 202 is generally associated with both swing arm 108 and support column 106 in some embodiments. Latch 202 is considered to be "associated with" support column 106 when latch 202 provides the ability to selectively lock swing arm 108 relative to support column 106, even if latch 202 does not directly engage support column 106. For example, as seen in FIG. 2A, latch 202 is associated with support column 106 even though a portion of latch 202 is mounted on an intermediate structure connected to support column 106 such as support flange 112 and does not directly contact support column 106.

Swing arm 108 is attached to support column 106 at a swing arm pivot point 204 which provides a pivotal attachment by means of a bolt or pin or the like. Swing arm pivot point 204 is located on the support flange 112 in some embodiments, thereby allowing swing arm 108 to pivot about a pivot axis that is oriented substantially parallel to the longitudinal direction of the support column 106. Alternatively, in additional embodiments, the swing arm pivot point 204 could be directly attached to the support column 106 or to another intermediate structure attached to support column 106 or base 102.

A first embodiment of swing arm 108 and latch 202, seen in FIG. 2A, shows latch 202 in a disengaged, or unlocked, position. In the disengaged position, swing arm 108 may angularly pivot in either angular direction. Swing arm latch 202 generally includes a first locking member associated with the support column 106 and a second locking member associated with the swing arm 108 in some embodiments.

In a first embodiment, the first locking member associated with the support column 106 includes a stop shaft 206. Stop shaft 206 includes a fully or partially threaded post in some embodiments. The second locking member in some embodiments includes a corresponding sliding member 208 positioned on the swing arm 108 to selectively engage the stop shaft 206 for locking and unlocking the swing arm 108.

Stop shaft 206 in some embodiments extends through a corresponding socket or hole 210 defined in support flange 112 located near the flange distal edge 212. Stop shaft 206 includes a stop shaft distal end 214 which extends generally toward the swing arm 108. Stop shaft distal end 214 may include a retaining end 216 configured to engage a portion of the second locking member, or sliding member 208. In some embodiments, retaining end 216 has a radius larger than that of an adjacent portion of stop shaft 202. Retaining end 216 includes the head of a bolt or screw installed in the distal end of stop shaft 206 in some embodiments. In other embodiments, retaining end 216 may be integrally formed on stop shaft 206 in a unitary, one-piece construction. Stop shaft distal end 214 may also include a locking groove 218 configured to receive a corresponding portion of second locking member, or sliding member 208, in some embodiments. Stop shaft distal end 214 includes both a retaining end 216 and a locking groove 218 in some embodiments.

FIG. 2B shows a detailed perspective view of an embodiment of a second locking member, or sliding member 208. In this embodiment, sliding member 208 includes a moveable plate 220. The second locking member is generally configured to be moveable relative to swing arm 108. In some embodiments, plate 220 is slidable relative to swing arm 108. As such, plate 220 can be selectively engaged with or disengaged from stop shaft 206 by sliding plate 220 relative to swing arm 108 either toward or away from stop shaft 206.

To facilitate sliding of plate 220, in some embodiments, plate 220 includes at least one slot defined therein, such as first longitudinal slot 222. In some embodiments, plate 220 also includes a second longitudinal slot 224 defined therein and oriented substantially parallel to first longitudinal slot 222. First and second longitudinal slots 222, 224 may be provided to improve stability of plate 220 on swing arm 108. Additional slots may be further added to plate 220. The first longitudinal slot 222 and second longitudinal slot 224 may include clearance slots formed through the entire width of plate 220 in some embodiments. Alternatively, first and/or second longitudinal slots 222, 224 include blind recesses defined in plate 220.

In some alternative embodiments, one or more slots, recesses or protrusions can be formed in or protrude from swing arm 108 for providing sliding engagement tracks between sliding member 208 and swing arm 108.

Second locking member, or sliding member 208, includes one or more features that support and slidably engage plate 220 in some embodiments. For example, as seen in FIG. 2B, a first rail 227a may be disposed at least partially in first longitudinal slot 222. First rail 227a extends from a first sliding member block 226a. First sliding member block 226a may be attached directly to swing arm 108 using one or more fasteners. Similarly, a second rail 227b is at least partially disposed in second longitudinal slot 224. Second rail 227b extends from a second sliding member block 226b. Second sliding member block 226b may also be attached directly to swing arm 108 using one or more fasteners. Plate 220 thus is generally moveable relative to first and second sliding member blocks 226a, 226b on first and second rails 227a, 227b. One or more additional fasteners may be inserted through first and second longitudinal slots to engage corresponding holes 229 on first and second rails 227a, 227b for slidably securing plate 220 to first and second sliding member blocks 226a, 226b and therefore to swing arm 108. These fasteners may include bolts, screws, rivets or the like.

Figure 4:
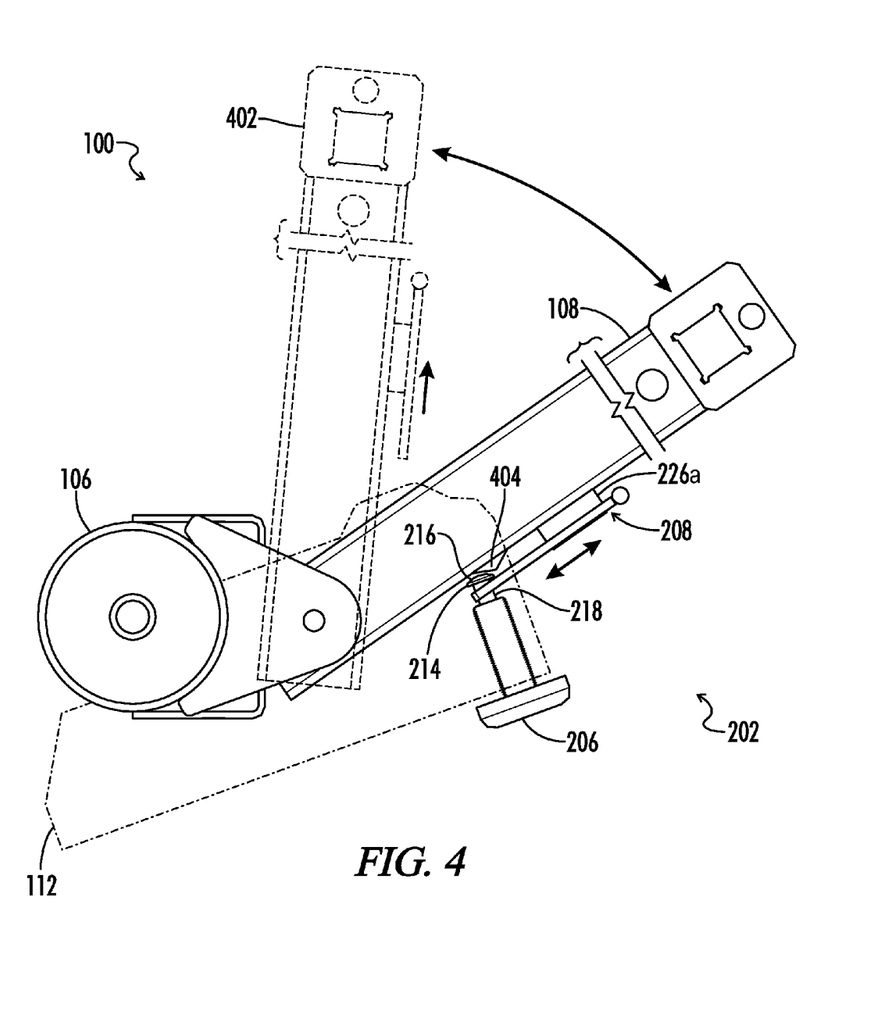
FIG. 4 is a top view of a first embodiment of a wheel servicing machine including a swing arm latch in a locked position.

Sliding member 208 generally includes at least one feature that allows engagement with a portion of the first locking member, or stop shaft 206. As seen further in FIG. 2B, plate 220 of sliding member 208 includes a proximate plate edge 228 closer to support column 106 and a distal plate edge 230 farther from support column 106. Plate 220 may also include a structural feature such as a notch 232 located in the proximate sliding member edge 228 configured to engage a corresponding portion of stop shaft 206 to place swing arm 108 in a locked angular position. Notch 232 is integrally formed as a recession in plate 220 in some embodiments. Notch 232 includes a recess dimensioned such that at least a portion of stop shaft 206 may be received therein. In some embodiments, the portion of stop shaft 206 at locking groove 218 is received in notch 232 when plate 220 is moved toward stop shaft 206, as seen in FIG. 4. In the locked position, retainer end 216 interferes with plate 220 to block angular movement of swing arm 108.

In an unlocked position, plate 220 can slide back on rails 227 away from stop shaft 206, thereby disengaging sliding member 208 from stop shaft 206. This allows swing arm 108 to pivot freely with respect to the support column 106, base 102, and wheel support 104. Coarse adjustments can then be made manually to the angular position of swing arm 108. For example, in an unlocked position, swing arm 108 can be manually pivoted away from the operator's work space.

Figure 3:
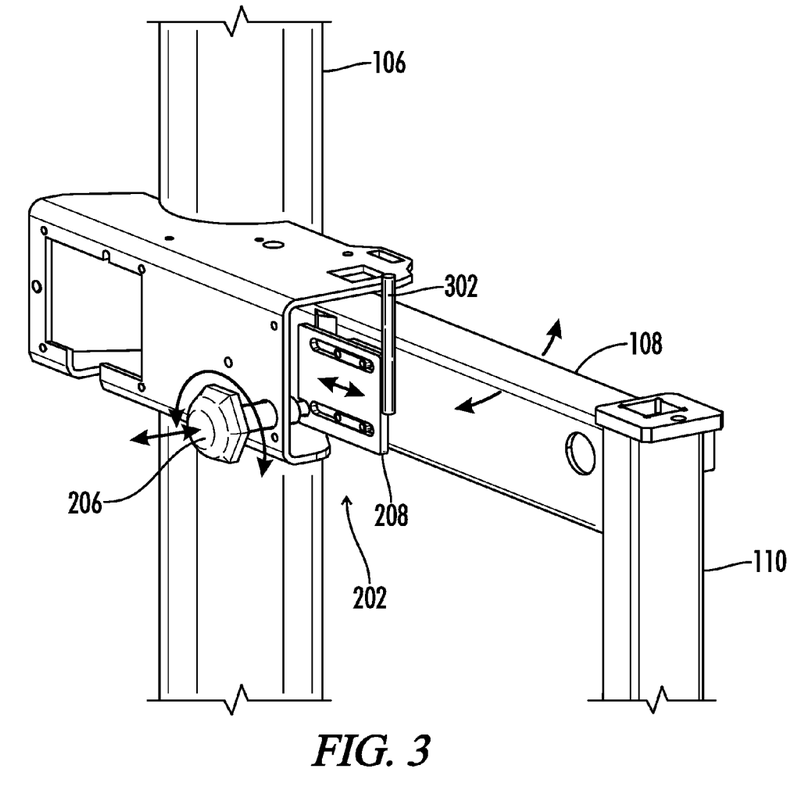
FIG. 3 is a perspective view of the first embodiment of a swing arm latch of FIG. 2A in an engaged, or locked, position.

FIG. 3 shows a first embodiment of latch 202 in a locked position with second locking member, or sliding member 208, having plate 220 pushed forward toward the support column 106. To lock the position of swing arm 108, sliding member 208 can be pushed forward to engage stop shaft 206. When sliding member 208 is engaged with the stop shaft 206, the swing arm 108 is locked in both angular directions. This type of locking engagement allows the position of the tire changing tool head 110 to be fixed in relation to a wheel and/or tire mounted on wheel holder 104. When the swing arm is in a locked position via latch 202, the machine operator no longer has to hold the swing arm 108 in position manually and thereby has a second free hand to assist in the operation of the wheel servicing machine 100.

The sliding member 208 may also include a handle 302 which aids in manually engaging and disengaging the sliding member 208 with the stop shaft 206. Handle 302 in some embodiments is attached to plate 220.

During use, when the swing arm is moved angularly toward support flange 112, the swing arm 108 eventually contacts the stop shaft distal end 214. Thus, the stop shaft distal end 214 operates as an angular stop for the swing arm 108. A contact plate 404 may be disposed on swing arm 108 at the location where stop shaft distal end 214 engages swing arm 108 to, inter alia, prevent excessive local wear on stop shaft 108 and/or to provide a normal engagement between stop shaft distal end 215 and swing arm 108.

In some embodiments, the location of stop shaft distal end 214, and thus the corresponding angular stop position of swing arm 108, is adjustable by way of a threaded portion of stop shaft 206 extending through a threaded stop shaft hole 210 in support flange 112. Rotation of stop shaft 206 may be achieved via a handle or knob on the proximal end of stop shaft 206 such that fine adjustments to the position of the stop shaft distal end 214 can be made. By rotating stop shaft 206 in a first direction, stop shaft distal end 214 can be moved toward swing arm 108. By rotating stop shaft 206 in a second or opposite direction, stop shaft distal end 214 can be moved away from swing arm 108. Stop shaft 206 therefore can be longitudinally adjustable in order to allow for fine adjustments to the angular stop position of the swing arm 108. As such, tire changing tool head 110 extending from swing arm 108 can be placed in a precise position by manually swinging the swing arm toward the support flange 112 until the swing arm engages the stop shaft distal end 214. If the operator needs to further adjust the angular stop position to operate on a different sized wheel, the operator can rotate the stop shaft to establish a new angular stop position for the swing arm.

FIG. 4 illustrates a top view of a wheel servicing apparatus 100 including a swing arm 108 in a locked position relative to support column 106. Latch 202 is in an engaged, or locked, position with the second locking member, or sliding member 208, engaging the first locking member, or stop shaft 206, to angularly secure the swing arm 108 in place. Sliding member 208 includes a notch 232 which mates with locking groove 218 on stop shaft 206 in some embodiments.

When latch 202 is placed in an unlocked position by disengaging the second locking member from the first locking member, or by disengaging the sliding member 208 from the stop shaft 206 in the first embodiment seen FIGS. 2A-4, swing arm 108 can be manually moved into a retracted position 402 outside the operator's working environment. This allows for better access to the wheel holder for other wheel servicing operations. When the swing arm is again needed, it may be manually pivoted toward the wheel holder until the swing arm engages and is stopped by the stop shaft distal end 214. At that point, the second locking member, or sliding member 208, may be manually pushed forward to lock the swing arm in place.

It is noted that many conventional swing arm tire changing machines utilize a swing arm configuration with a support flange as generally seen in FIG. 1. In some embodiments, the present invention provides a modular component that may be added to an existing conventional swing arm tire changing machine to add a swing arm latch. For example, a conventional tire changing machine may be retrofitted with a swing arm latch and associated hardware in accordance with the present invention. In some embodiments, the present invention includes a kit for retrofitting a conventional tire changing machine to include a swing arm latch. The kit includes a stop shaft 206 having a stop shaft distal end 214 with a retaining end 216 disposed thereon, at least one support block 226 configured for attachment to a swing arm 108 on a tire changing machine, and a plate 220 configured for sliding engagement with the block 226 and configured to be selectively moveable relative to the stop shaft 206 and swing arm 108 when the plate 220 and support block 226 are installed on the swing arm 108.

As noted above, a swing arm latch having a first locking member associated with a support column and a second locking member associated with a swing arm may include numerous embodiments within the scope of the present invention.

Figure 5:
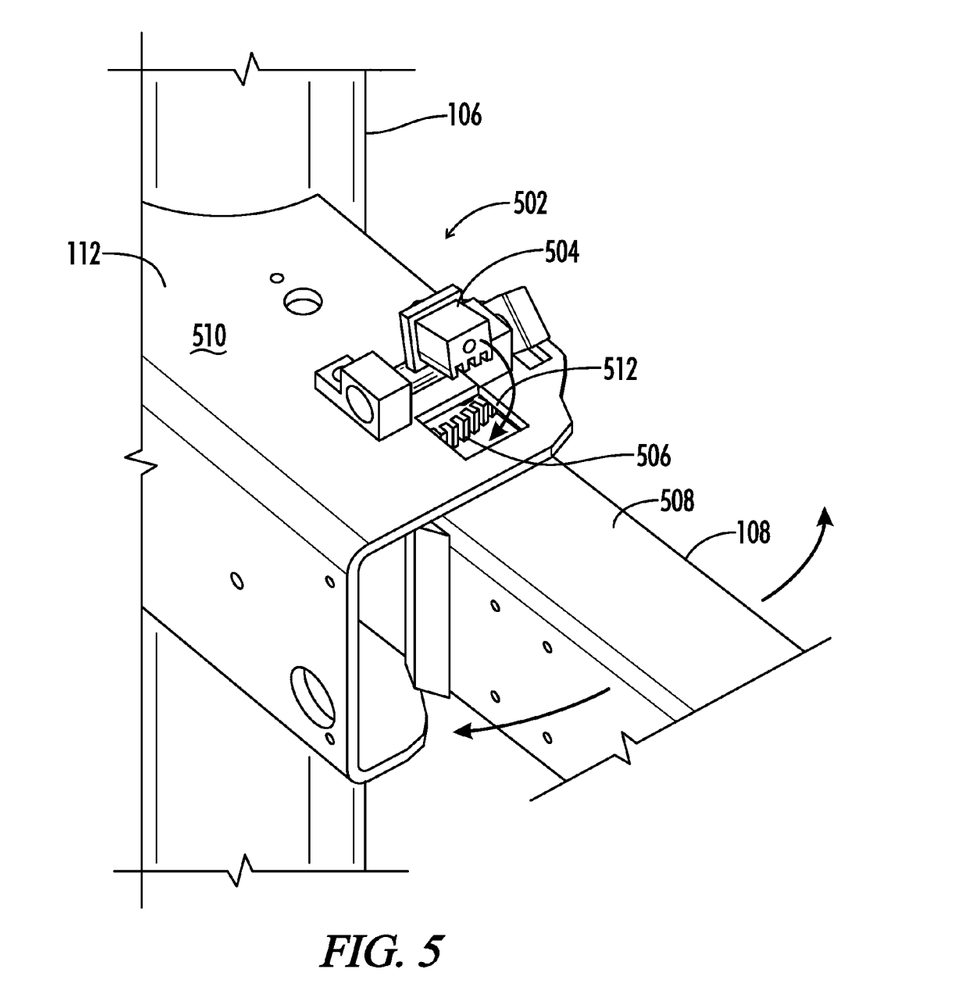
FIG. 5 is a perspective view of a second embodiment of a swing arm latch for a wheel servicing machine in a disengaged, or unlocked, position.

FIG. 5 shows a perspective view of a second embodiment of a swing arm latch 502, or clasp, for angularly locking and unlocking a swing arm relative to a support column. Latch 502 includes a first locking member 504 associated with support column 106. In this embodiment, first locking member 504 is pivotally attached to support flange 112. A corresponding second locking member 506 is disposed on the upper swing arm surface 508. First locking member 504 may include one or more teeth that are shaped to selectively engage one or more corresponding recesses in second locking member 506. Additionally, first locking member 504 may include one or more recesses shaped to selectively engage one or more corresponding teeth in the first locking member. In this configuration, first and second locking members 504, 506 may resemble portions of gears. As such, first locking member 504 in this embodiment may be referred to as a first gear portion, and second locking member 506 may be referred to as a second gear portion.

Figure 6:
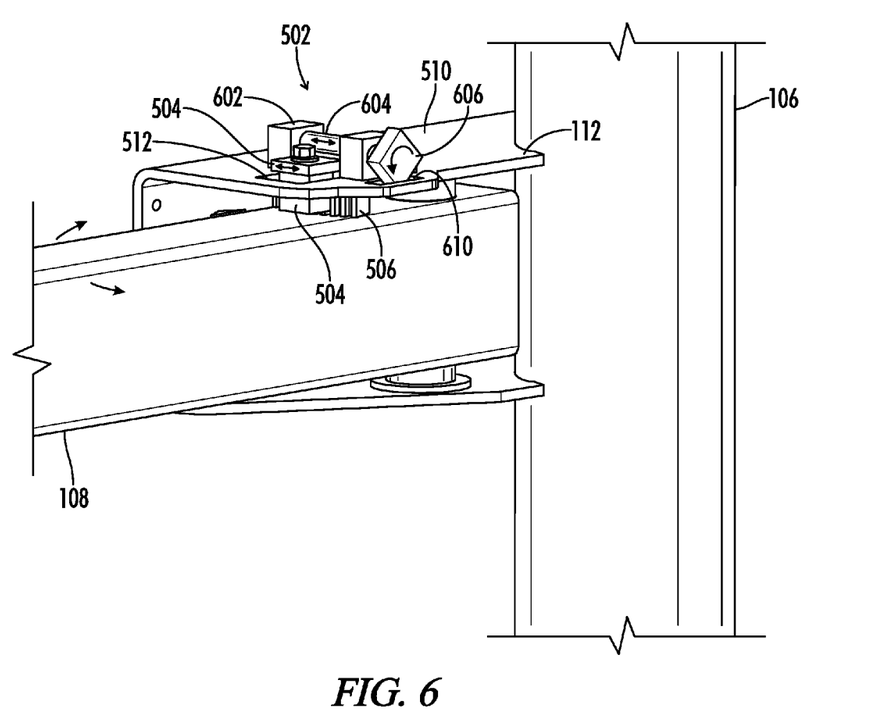
FIG. 6 is a perspective view of the second embodiment of swing arm latch of FIG. 5 in an engaged, or locked, position.

First locking member 504 is generally pivotable both toward and away from swing arm 108. In some embodiments, first locking member 504 is mounted on a hinge 602, seen in FIG. 6, such that first locking member may pivot downwardly toward swing arm 108. In embodiments where first locking member 504 is mounted on the upper portion of support flange 112, as seen in FIG. 5 and FIG. 6, an opening 512 may be defined in the support flange 112 to allow passage of first locking member 504 at least partially therethrough. In other embodiments, first locking member may pivot downwardly over an edge of support flange 112. As such, first locking member 504 can engage second locking member 506 when second locking member 506 is positioned below the opening 512. For example, a user may manually move swing arm 108 into a position where second locking member 506 is located below first locking member 504. This may be accomplished across a wide range of angular positions for swing arm 108 because second locking member 506 may have a width greater than the width of swing arm 108 in some embodiments. In some embodiments, second locking member 506 is fixed on support arm 108 and includes a width large enough to provide engagement with first locking member across the entire range of angular movement of swing arm 108. Once the swing arm 108 is positioned at a desired angular location, first locking member 504 is manually pivoted downwardly such that at least one structure on first locking member 504 engages a corresponding structure on second locking member 506, as seen in FIG. 5 and FIG. 6. As such, swing arm 108 may be locked at a desired angular position such that swing arm 108 cannot move in either angular direction during a wheel servicing operation. To release, or unlock, the swing arm 108, first locking member 504 can be manually lifted from engagement with second locking member 506. In the unlocked position, as seen in FIG. 5, swing arm 108 can be manually moved to a desired position away from the wheel holder or alternatively can be moved from an outer position toward the wheel holder.

In some embodiments, hinge 602 includes a linear stage 604 disposed thereon. A first locking member 504 is mounted on the linear stage 604. Linear stage 604 is coupled to a control knob 606. An operator may turn control knob 606 to manually reposition first locking member 504 along the direction of travel of linear stage 604. Stage 604 allows an operator to finely adjust the position of first locking member to set a precise angular stop location for swing arm 108.

In some embodiments, opening 512 is larger than the width of the first gear portion 504, as seen in FIG. 6. This allows for fine adjustments to be made to the position of the first gear portion which in turn allows fine adjustments to be made to the position of the swing arm 108 relative to the support column 106 when latch 502 is in a locked position. Additionally, knob 606 and stage 604 allow first locking member 504 to be repositioned when latch 502 is in an unlocked position, as seen in FIG. 5. Knob 606 is partially received in a knob hole 610 in some embodiments to fix the position of knob 606 relative to stage 602. As such, knob 608 cannot move laterally when turned.

In various reverse embodiments, a swing arm latch includes a first locking member associated with the support column and a second locking member associated with the swing arm, wherein the second locking member is moveable and the first locking member is fixed. For example, some embodiments may include a pivotable locking member disposed on the swing arm and a fixed locking member disposed on the support flange or support column.

In some alternative embodiments, a swing arm latch may include a retractable pin extending downwardly from the support flange toward the swing arm. The retractable pin is configured to engage a corresponding structure associated with the swing arm, such as a hole defined therein or a locking member attached to the swing arm. This configuration may also be reversed.

In some alternative embodiments, a second embodiment of a latch 502 illustrated in FIG. 5 and FIG. 6 may be provided as a kit for retrofitting a conventional swing arm tire changing machine. The kit includes a first locking member configured for attachment to a support flange and a second locking member configured for attachment to the swing arm. The first locking member further includes a hinge that may be directly attached to the support flange in some embodiments, wherein the first locking member is pivotally attached to the hinge and selectively engageable with the second locking member when installed on the machine.

Although there have been described particular embodiments of the present invention of a new and useful "SWING ARM LATCH FOR A WHEEL SERVICING MACHINE", it is not intended that such references be construed as limitations upon the scope of this invention except as set forth in the following claims.

What is claimed is:

1. A wheel servicing machine, comprising:
    a base;
    a rotatable wheel holder on the base;
    a support column extending from the base;
    a swing arm pivotally attached to the support column; and
    a latch associated with both the swing arm and the support column, the latch including:
        a stop shaft connected to the support column, the stop shaft including a retaining end that is configured to be adjusted relative to the support column; and
        a plate slidably connected to the swing arm and configured to selectively engage the retaining end of the stop shaft to selectively lock the swing arm at a desired angular position.

2. The apparatus of claim 1, wherein the stop shaft includes a threaded shaft.

3. The apparatus of claim 2, further comprising:
    a support flange rigidly attached to the swing arm;
    a threaded hole defined in the support flange; and
    wherein the stop shaft extends through the hole toward the swing arm.

4. A tire changing machine, comprising:
    a base;
    a rotatable tire holder on the base;
    a support column extending from the base;
    a swing arm pivotally attached to the support column;
    a support flange protruding from the support column;

a stop shaft disposed on the support flange, the stop shaft including a distal stop shaft end projecting toward the swing arm;

a locking groove defined in the stop shaft near the stop shaft distal end;

a sliding member disposed on the swing arm, the sliding member positioned to slide relative to the swing arm; and wherein the sliding member is configured to be received in the locking groove, to selectively engage the stop shaft, and to angularly lock the swing arm relative to the support column.

5. The apparatus of claim 4, further comprising:

the sliding member including a moveable plate having a proximal edge;

a recess defined in the proximal edge; and a retainer end disposed on the stop shaft distal end, the retainer end having a dimension larger than the recess.

6. The apparatus of claim 5, further comprising:

a first longitudinal slot defined in the plate;

a first rail extending from the swing arm; and wherein the first rail is slidably received in the first longitudinal slot.

7. The apparatus of claim 6, further comprising:

a second longitudinal slot defined in the plate;

a second rail extending from the swing arm; and wherein the second rail is slidably received in the first longitudinal slot.

8. The apparatus of claim 7, wherein the plate is longitudinally moveable relative to the swing arm such that the first and second rails are moveable in the first and second longitudinal slots, respectively.

* * * * *